No. 623,405. Patented Apr. 18, 1899.
W. W. KITCHEN.
VEHICLE WHEEL.
(Application filed Dec. 22, 1898.)
(No Model.)
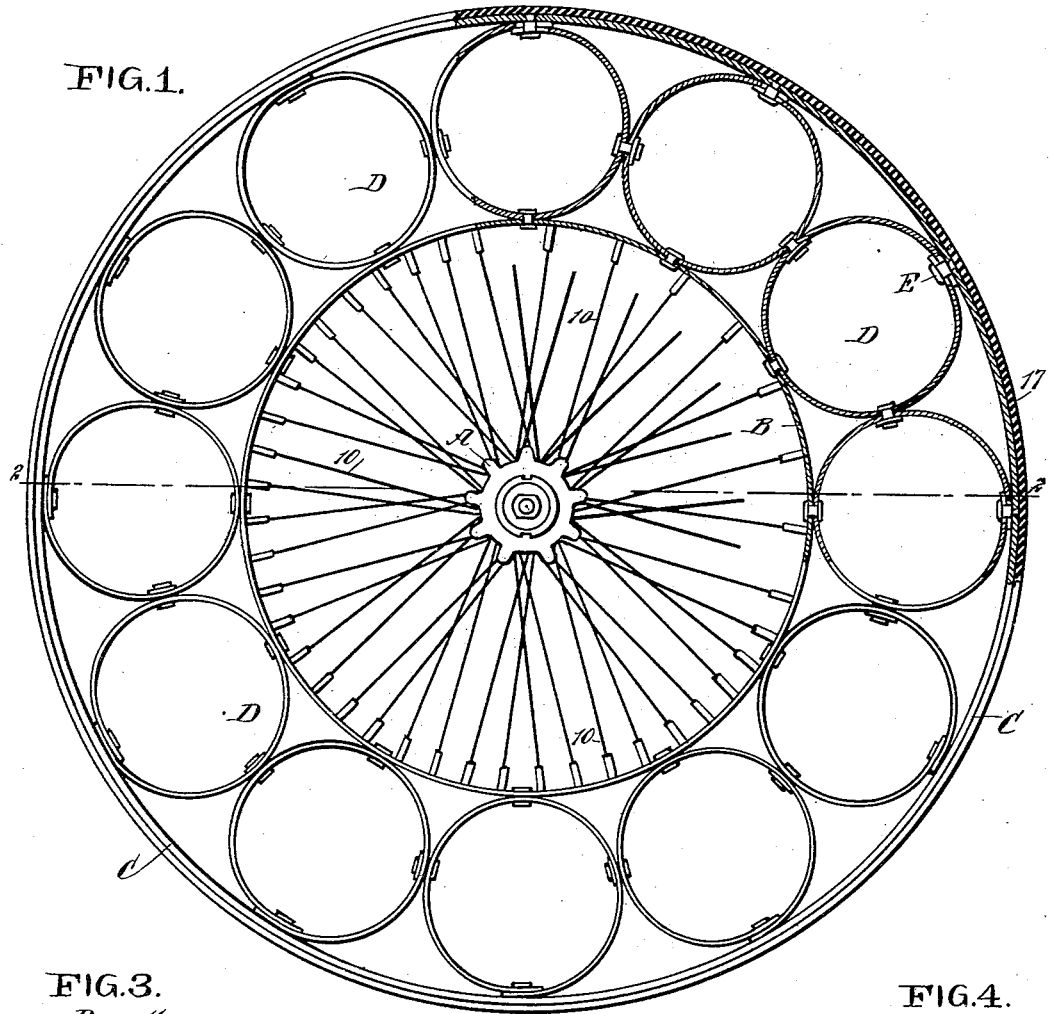
FIG. 1.
FIG. 3.
FIG. 2.
FIG. 4.
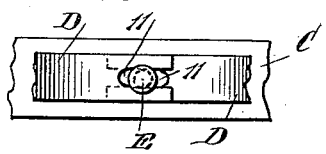
WITNESSES:
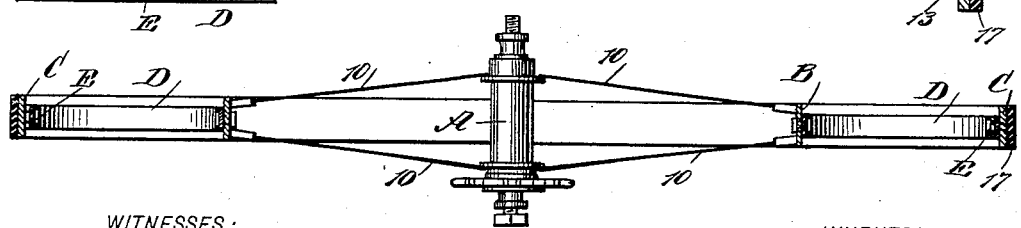
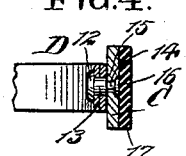
INVENTOR
William W. Kitchen.
BY
ATTORNEYS.

UNITED STATES PATENT OFFICE.

WILLIAM W. KITCHEN, OF ROCHESTER, NEW YORK.

VEHICLE-WHEEL.

SPECIFICATION forming part of Letters Patent No. 623,405, dated April 18, 1899.

Application filed December 22, 1898. Serial No. 700,030. (No model.)

*To all whom it may concern:*

Be it known that I, WILLIAM W. KITCHEN, of Rochester, in the county of Monroe and State of New York, have invented a new and Improved Vehicle-Wheel, of which the following is a full, clear, and exact description.

The objects of my invention are to construct a wheel especially adapted for bicycles or other machines or vehicles upon which wheels having pneumatic tires are usually employed, to provide such a wheel with a non-puncturable tire, and to so construct said wheel that it will be stronger than the usual pneumatic wheel, being equally buoyant and more economic to manufacture.

Another object of the invention is to construct a wheel of the character above set forth that will not be liable to frequent repair and wherein when repairs are necessary they can be quickly made by any person having a knowledge of iron-working and at slight cost.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a wheel embodying my improvements, parts being in section. Fig. 2 is a transverse section on the line 2 2 of Fig. 1. Fig. 3 is an inner face view of a portion of the outer rim of the wheel and the ends of a spring-support connected with said outer rim, and Fig. 4 is a transverse section through the outer rim and tire and end portions of the supporting-spring connected with the rim.

A represents a hub, of any approved construction, and B an inner rim connected with the hub A by spokes 10, the spokes being preferably attached to the inner rim B near its outer edges. The inner rim B is connected with the outer rim C through the medium of a series of band-springs D, and these springs are secured by rivets or their equivalents to each other and to the inner rim B. The ends of the band-springs, however, are arranged to overlap, as shown in Fig. 3, and the overlapping ends of the band-springs are provided with longitudinal slots 11, as is also shown in Fig. 3. The ends of the band-springs are adapted to have play against the inner face of the outer rim C, yet are connected with the said rim. This connection is effected, preferably, through the medium of studs E, the said studs comprising inner heads 12 and body portions 13 adjacent to said heads, the body portions of the studs entering the slots 11 of the overlapping ends of the band-springs, and in the further construction of the studs E outer reduced portions 14 are provided, forming shoulders 15, which shoulders bear against the inner face of the outer rim C, as is shown in Fig. 4, while the outer ends of the reduced portions of the studs are flattened or riveted upon the outer face of the outer rim C in such manner as to produce outer heads 16, also illustrated in Fig. 4.

A stud E is provided for the overlapping ends of each band-spring, and the ends of the springs have more or less movement upon one another, guided by the said studs. A tire 17 of any approved construction is usually secured to the outer face of the outer rim C, and preferably this tire consists of a solid strip of rubber or other elastic material. While the use of this tire 17 is preferred, it may be omitted without departing from the spirit of the invention.

A wheel constructed as above described possesses all the buoyancy and elasticity of a wheel provided with a pneumatic tire and has the advantage of being much stronger and of being more easily repaired, since if any one of the band-springs should become broken or should be rendered defective by removing the rivets the injured spring may be removed from the wheel and quickly replaced by a perfect one.

Having thus described my invention, I claim as new and desire to secure by Letters Patent—

1. A vehicle-wheel, comprising an inner rim, a hub supporting the inner rim, and band-springs interposed between the two rims, the springs being secured to each other and to one rim and having their ends adjustably secured together and to the other rim, as and for the purpose set forth.

2. A vehicle-wheel, comprising an inner rim, a hub supporting the inner rim, an outer rim, band-springs closely grouped in the space between the two rims, the band-springs being secured to the inner rim and to each other, the ends of the band-springs adjacent to the outer rim being slotted and mounted to slide upon each other, and guides passed through the slotted portions of the band-springs and into the outer rim, as and for the purpose set forth.

3. A vehicle-wheel, comprising a hub, an inner rim, spokes connecting the inner rim with the hub, a series of band-springs closely grouped in the space between the two rims, the said band-springs being secured to each other and to the inner rim, the said band-springs where they connect with the outer rim being mounted to slide upon each other, having their ends slotted, and studs passed through the slotted ends of the said band-springs, the said studs being secured in the outer rim of the wheel, as and for the purpose specified.

WILLIAM W. KITCHEN.

Witnesses:
J. FRED. ACKER,
EVERARD BOLTON MARSHALL.